(12) United States Patent
Ogasahara (10) Patent No.: US 8,237,829 B2
(45) Date of Patent: Aug. 7, 2012

(54) IMAGE PROCESSING DEVICE, IMAGE PROCESSING METHOD, AND IMAGING APPARATUS

(75) Inventor: Takayuki Ogasahara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 195 days.

(21) Appl. No.: 12/752,436

(22) Filed: Apr. 1, 2010

(65) Prior Publication Data

US 2010/0328502 A1  Dec. 30, 2010

(30) Foreign Application Priority Data

Jun. 30, 2009  (JP) .................................. 2009-156278

(51) Int. Cl.
  *H04N 9/07* (2006.01)
(52) U.S. Cl. ...................................................... 348/266
(58) Field of Classification Search ................... 348/266; 382/165
  See application file for complete search history.

(56) References Cited

U.S. PATENT DOCUMENTS

| | | | |
|---|---|---|---|
| 7,554,732 B2 * | 6/2009 | Dowski, Jr. ................... | 359/558 |
| 8,013,928 B2 * | 9/2011 | Egawa .......................... | 348/345 |
| 2007/0076296 A1 * | 4/2007 | Dowski, Jr. ................... | 359/558 |
| 2009/0251569 A1 * | 10/2009 | Nonaka ....................... | 348/240.1 |

FOREIGN PATENT DOCUMENTS

JP  2009-17544  1/2009

OTHER PUBLICATIONS

U.S. Appl. No. 13/353,876, filed Jan. 19, 2012, Ogasahara.

\* cited by examiner

*Primary Examiner* — Jason Chan
*Assistant Examiner* — Gary C Vieaux
(74) *Attorney, Agent, or Firm* — Oblon, Spivak, McClelland, Maier & Neustadt, L.L.P.

(57) ABSTRACT

A frequency component comparing unit performs frequency component comparison for each of the image signals corresponding to the wavelength components subjected to resolution reconstruction. An image synthesizing unit performs image synthesis with an image signal that is selected according to a comparison result of the frequency component comparing unit as a component. The wavelength component that is subjected to frequency component comparison by frequency component comparing unit is selected according to the modulation transfer function characteristic of the optical system.

20 Claims, 6 Drawing Sheets

IMAGE PROCESSING DEVICE, IMAGE PROCESSING METHOD, AND IMAGING APPARATUS

CROSS-REFERENCE TO RELATED APPLICATIONS

This application is based upon and claims the benefit of priority from the prior Japanese Patent Application No. 2009-156278, filed on Jun. 30, 2009; the entire contents of which are incorporated herein by reference.

BACKGROUND OF THE INVENTION

1. Field of the Invention

The present invention relates to an image processing device, an image processing method, and an imaging apparatus.

2. Description of the Related Art

Typically, a lens module having the auto-focus function is used in capturing images over a wide range from a short distance to infinity. However, while implementing the auto-focus function, an increase in the number of lenses or components that leads to an increase in the manufacturing cost represents a challenge. Particularly, in the case of a camera module intended for use in a portable device, the demand for downsizing or making slim models means that a thick lens module is not suitable. Meanwhile, regarding a fixed-focus camera module, although making slim models is easier, it is difficult to secure sufficient depth of field at a short distance and at infinity (regarding depth of field, see, for example, Japanese Patent Application Laid-open No. 2009-17544). For example, in a lens module that includes a lens designed to capture images at a short distance, the modulation transfer function (MTF) at infinity reduces drastically thereby making it difficult to achieve sufficient depth of field.

BRIEF SUMMARY OF THE INVENTION

An image processing device according to an embodiment of the present invention comprises: a resolution reconstruction unit that, with respect to image signals corresponding to wavelength components of at least two colors from among image signals obtained by incorporating light in an optical system, performs resolution reconstruction for each of the wavelength components; a frequency component comparing unit that performs frequency component comparison for each of the image signals corresponding to the wavelength components subjected to resolution reconstruction; and an image synthesizing unit that performs image synthesis with an image signal that is selected according to a comparison result of the frequency component comparing unit as a component, wherein the frequency component comparing unit performs frequency component comparison for a wavelength component selected according to a modulation transfer function characteristic of the optical system.

An image processing method according to an embodiment of the present invention comprises: resolution-reconstructing that includes performing, with respect to image signals corresponding to wavelength components of at least two colors from among image signals obtained by incorporating light in an optical system, resolution reconstruction for each of the wavelength components; comparing that includes performing frequency component comparison for each of the image signals corresponding to the wavelength components subjected to resolution reconstruction; and synthesizing that includes performing image synthesis with an image signal that is selected according to a comparison result at the comparing as a component, wherein the comparing includes performing frequency component comparison for a wavelength component selected according to a modulation transfer function characteristic of the optical system.

An imaging apparatus according to an embodiment of the present invention comprises: an optical system that incorporates light; an image sensor unit that captures an image of a subject by converting the light incorporated by the optical system into a signal charge; and an image processing device that processes an image signal obtained by image capturing performed by the image sensor unit, the image processing device including a resolution reconstruction unit that, with respect to image signals corresponding to wavelength components of at least two colors, performs resolution reconstruction for each of the wavelength components; a frequency component comparing unit that performs frequency component comparison for each of the image signals corresponding to the wavelength components subjected to resolution reconstruction; and an image synthesizing unit that performs image synthesis with an image signal that is selected according to a comparison result of the frequency component comparing unit as a component, wherein the frequency component comparing unit performs frequency component comparison for a wavelength component selected according to a modulation transfer function characteristic of the optical system.

DETAILED DESCRIPTION OF THE INVENTION

Exemplary embodiments of an image processing device, an image processing method, and an imaging apparatus according to the present invention will be explained below in detail with reference to the accompanying drawings. The present invention is not limited to the following embodiments.

Figure 1:
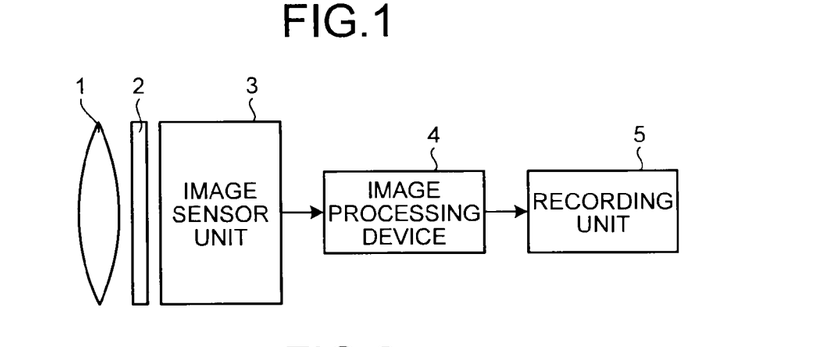
FIG. 1 is a block diagram of a configuration of an imaging apparatus including an image processing device according to a first embodiment of the present invention.

FIG. 1 is a block diagram of a configuration of an imaging apparatus including an image processing device 4 according to a first embodiment of the present invention. The imaging apparatus includes an imaging lens 1, an infrared (IR) cut filter 2, an image sensor unit 3, the image processing device 4, and a recording unit 5.

The imaging lens 1 constitutes an optical system for incorporating the light from a subject. The IR cut filter 2 removes the infrared light from the light incorporated by the imaging lens 1. The image sensor unit 3 captures an image of the subject by converting the light incorporated by the imaging lens 1 into a signal charge. More particularly, the image sensor unit 3 generates analog image signals by incorporating, in an order corresponding to the Bayer array, the pixel values of red (R), green (G), and blue (B) and sequentially amplifies the image signals to gains according to the imaging condition. Besides, the image sensor unit 3 converts the analog image signals into digital image signals. The image processing device 4 performs a variety of operations on the digital image signals received from the image sensor unit 3. The recording unit 5 records the image data received from the image processing device 4 in a memory or in a recording medium.

Figure 2:
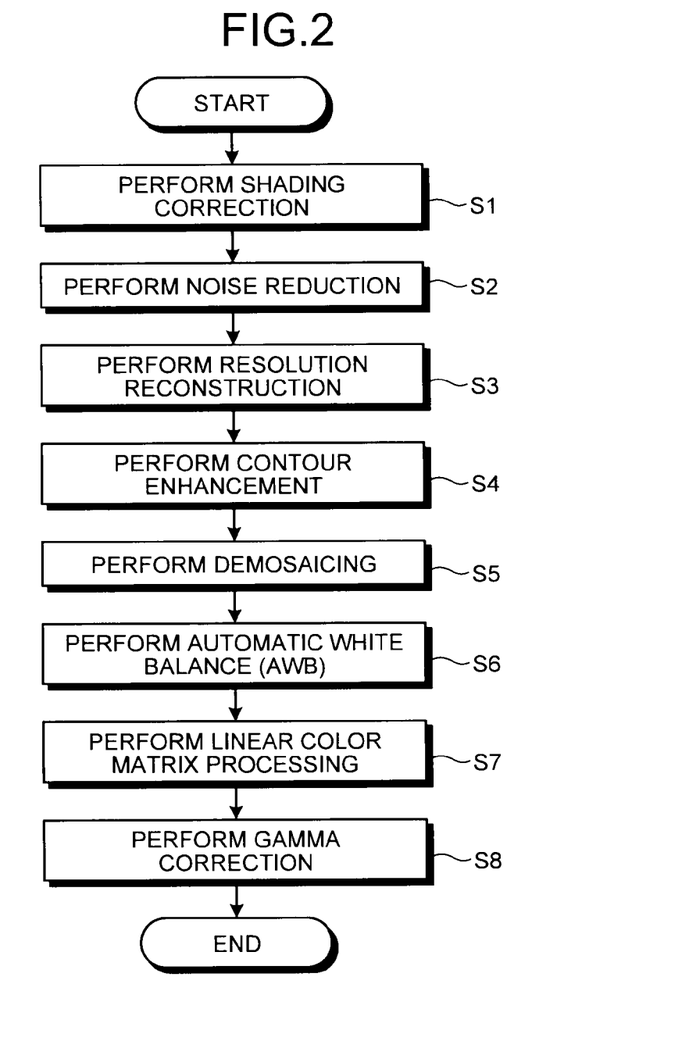
FIG. 2 is a flowchart for explaining a sequence of operations performed by the image processing device.

FIG. 2 is a flowchart for explaining a sequence of operations performed by the image processing device 4. Firstly, the image processing device 4 corrects unevenness in the brightness (i.e., performs shading correction) that occurs due to the difference in the light intensity at the central region and the light intensity at the surrounding region of the imaging lens 1 (Step S1). Then, the image processing device 4 removes noise such as fixed pattern noise, dark current, and shot noise (i.e., performs noise reduction) (Step S2). The noise reduction operation proves useful in the case of low light photography or in the case when light receiving elements have low sensitivity. It is desirable to perform the noise reduction operation before and after performing resolution reconstruction. Subsequently, a resolution reconstruction unit (not illustrated) performs resolution reconstruction (Step S3). Meanwhile, resolution reconstruction performed for a macro mode that is selected in the case of photographing a short-distance subject is described later in detail.

Then, the image processing device 4 performs contour enhancement with the use of a correction coefficient calculated based on the imaging condition of the image sensor unit 3 and the position of each pixel (Step S4). Subsequently, the image processing device 4 performs image interpolation (i.e., demosaicing) with respect to the digital image signals received in the order of the Bayer array (Step S5). In the demosaicing operation, a sensitivity level value of missing color components is generated by performing interpolation of the image signals obtained by capturing an image of the subject. Then, the image processing device 4 performs automatic white balance (AWB) control with respect to the image (Step S6) and performs linear color matrix processing in order to obtain color reproducibility (Step S7). Subsequently, the image processing device 4 performs gamma correction in order to correct the saturation or the brightness in the image to be displayed on a display (Step S8). Meanwhile, the above-mentioned sequence of operations according to the present embodiment is only exemplary and can be subjected to modification such as addition of operations, omission of omissible operations, or changes in the order of operations.

Figure 3:
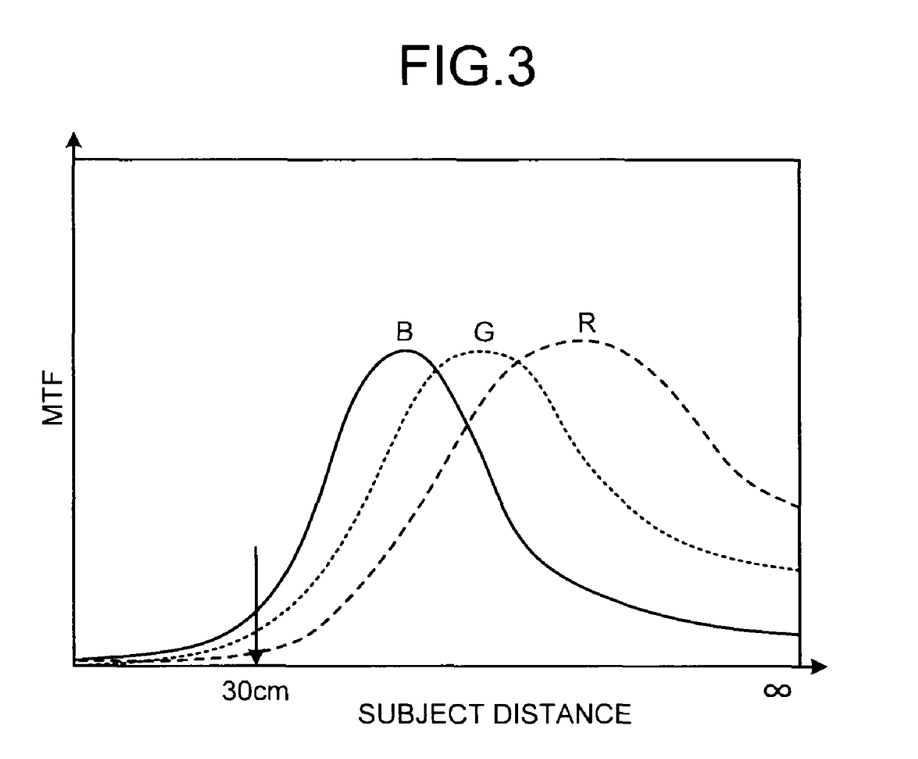
FIG. 3 is a graph of an exemplary MTF characteristic of the optical system in the imaging apparatus.

FIG. 3 is a graph of an exemplary MTF characteristic of the optical system in the imaging apparatus. The graph represents a relation between the subject distance and the MTF at ½ Nyquist regarding each of the R, G, and B components. The MTF is a function representing the modulation of an image of a sine wave object corresponding to an increase in spatial frequency. In the case of a fixed-focus optical system, when sufficient depth of field is secured at a certain subject distance from infinity, then it becomes difficult to achieve sufficient depth of field at a short distance. In regard to that problem, the image processing device 4 according to the present embodiment performs operations for achieving high-resolution images in short-distance photography.

Figure 4:
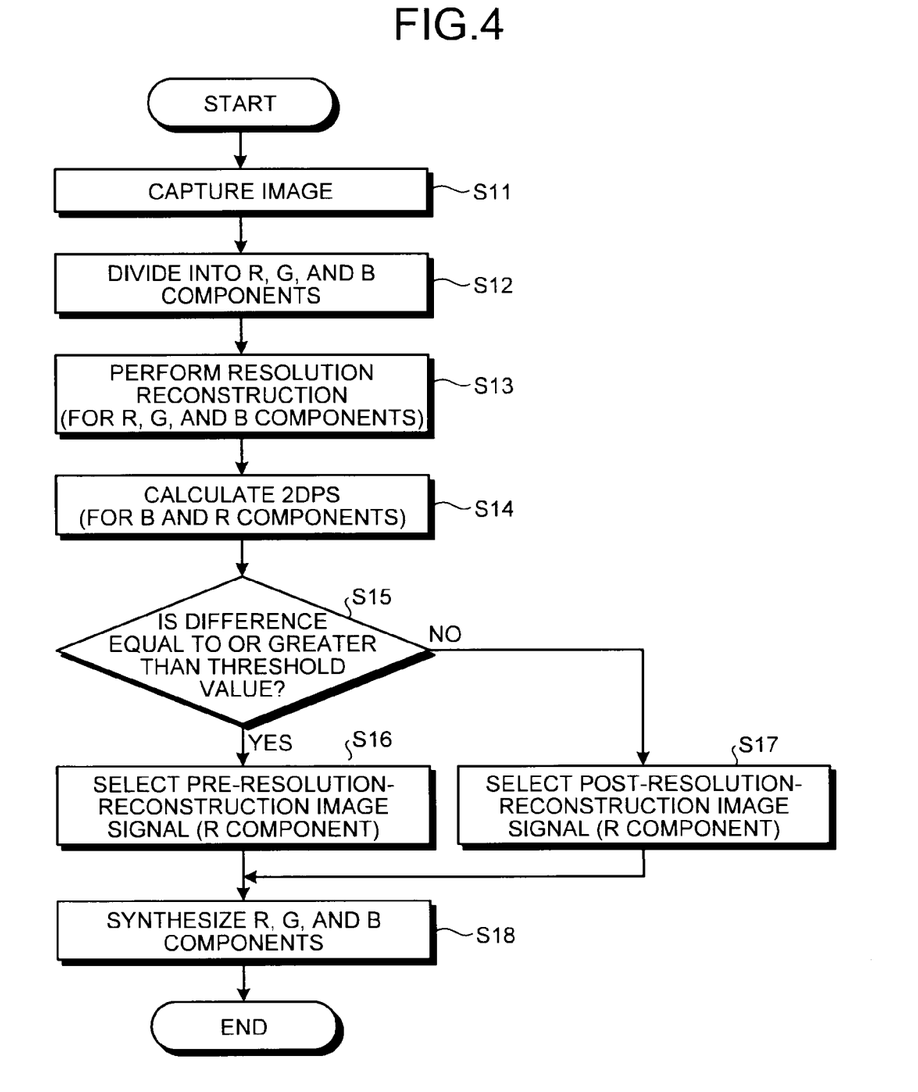
FIG. 4 is a flowchart for explaining a sequence of operations peculiar to the macro mode.

FIG. 4 is a flowchart for explaining a sequence of operations peculiar to the macro mode. When an image of a short-distance subject is captured (Step S11), the image sensor unit 3 generates separate image signals corresponding to the R, G, and B components (Step S12). Then, the resolution reconstruction unit performs resolution reconstruction with respect to the image signal of each of the R, G, and B components (Step S13).

More particularly, the resolution reconstruction unit performs resolution reconstruction based on a lens characteristic of the imaging lens 1. As the lens characteristic, for example, the point spread function (PSF) is used. The PSF is written in advance in, for example, a register or a random access memory (RAM) and then read out at the time of performing resolution reconstruction. The effect of resolution reconstruction depends on the algorithm used for it. As an algorithm for reconstructing an image that resembles the original subject image during resolution reconstruction, for example, the Richardson-Lucy deconvolution is implemented. Subsequently, with respect to each image signal subjected to resolution reconstruction, conversion from the real space to the frequency space is performed using, for example, the Fast Fourier Transform (FFT) and a corresponding two-dimensional power spectrum (2DPS) is calculated (Step S14).

According to the graph illustrated in FIG. 3, longer the wavelength of a component, longer the distance of the peak of the MTF. For a short distance, the MTF goes on decreasing in the descending order of the B, G, and R components. For example, if the subject distance is reduced to about 30 cm, then the MTF for the R component decreases to an extremely low value as compared to the MTF for the B component and the MTF for the G component. Hence, regarding the R component, there are times when a sufficient effect of resolution reconstruction is not achieved. Besides, by performing resolution reconstruction with respect to the R component, contour enhancement performed at Step S4 (see FIG. 2) can sometimes cause ringing, which is a phenomenon in which the edges appear blurred.

Subsequently, at a predetermined subject distance such as 30 cm in this case, the B component having the highest MTF (first wavelength component) and the R component having the lowest MTF (second wavelength component) are selected and the respective 2DPSs are calculated (Step S14). Then, a frequency component comparing unit (not illustrated) compares the 2DPS calculated for the B component with the 2DPS calculated for the R component and calculates a difference therebetween. The frequency component comparing unit performs frequency component comparison regarding the B and R components selected according to the MTF characteristic of the imaging lens 1. Subsequently, the frequency component comparing unit compares the difference calculated at Step S14 with a predetermined threshold value (Step S15). The threshold value is written in advance in the register or the RAM. Moreover, the threshold value can be determined arbitrarily and, for example, separately for each product.

If the difference is equal to or greater than the threshold value (Yes at Step S15); then the frequency component comparing unit selects a pre-resolution-reconstruction image signal as the R component to be synthesized by an image synthesizing unit (not illustrated) (Step S16). On the other hand, if the difference is smaller than the threshold value (No at Step S15); then the frequency component comparing unit selects a post-resolution-reconstruction image signal as the R component to be synthesized by the image synthesizing unit (Step S17).

The image synthesizing unit performs image synthesis by carrying out demosaicing in which the image signals of the G and B components subjected to resolution reconstruction at Step S13 and the image signal of the R component selected at Step S16 or Step S17 are considered as components (Step S18). Meanwhile, with respect to the 2DPSs, it is also possible to perform weighting with the use of ½ Nyquist, ¼ Nyquist, or the visual transfer function (VTF), which is a visual MTF characteristic, so that a visually favorable image can be selected.

Meanwhile, regarding the image processing performed in a normal mode as a mode other than the macro mode, the resolution reconstruction operation is essentially omissible. However, if there is a request for achieving a deep depth of field such as in the case of a lens of fixed-focus type and extended depth field (EDoF) type, then the resolution reconstruction operation can be performed in the normal mode as well. In the normal mode, the sequence of operations from Step S11 to Step S18 can be performed in an identical manner to that of the macro mode. Moreover, for the resolution reconstruction operation in the normal mode, the threshold value used for comparison at Step S15 can be set differently than the threshold value for the resolution reconstruction operation in the macro mode. In the macro mode as well as in the normal mode, the threshold value is set to prevent image deterioration due to excessive resolution reconstruction.

Thus, according to the first embodiment, by performing image synthesis after carrying out the operations according to the MTF characteristic of the optical system, it becomes possible to achieve high-resolution images in short-distance photography. For that reason, high-resolution images can be achieved even when photography is done with a fixed-focus camera module.

Meanwhile, as the first wavelength component used for 2DPS comparison in the optical system having the MTF characteristic illustrated in FIG. 3, it is also possible to select the G component in place of the B component. For example, under the condition of a low color temperature (e.g., about 3200 K), the sensitivity of the G component is greater than the B component. Hence, by selecting the G component as the first wavelength component, a high-resolution image can be achieved with high accuracy. Meanwhile, the algorithm used in resolution reconstruction is not limited to the Richardson-Lucy deconvolution and other algorithms can also be implemented.

Figure 5:
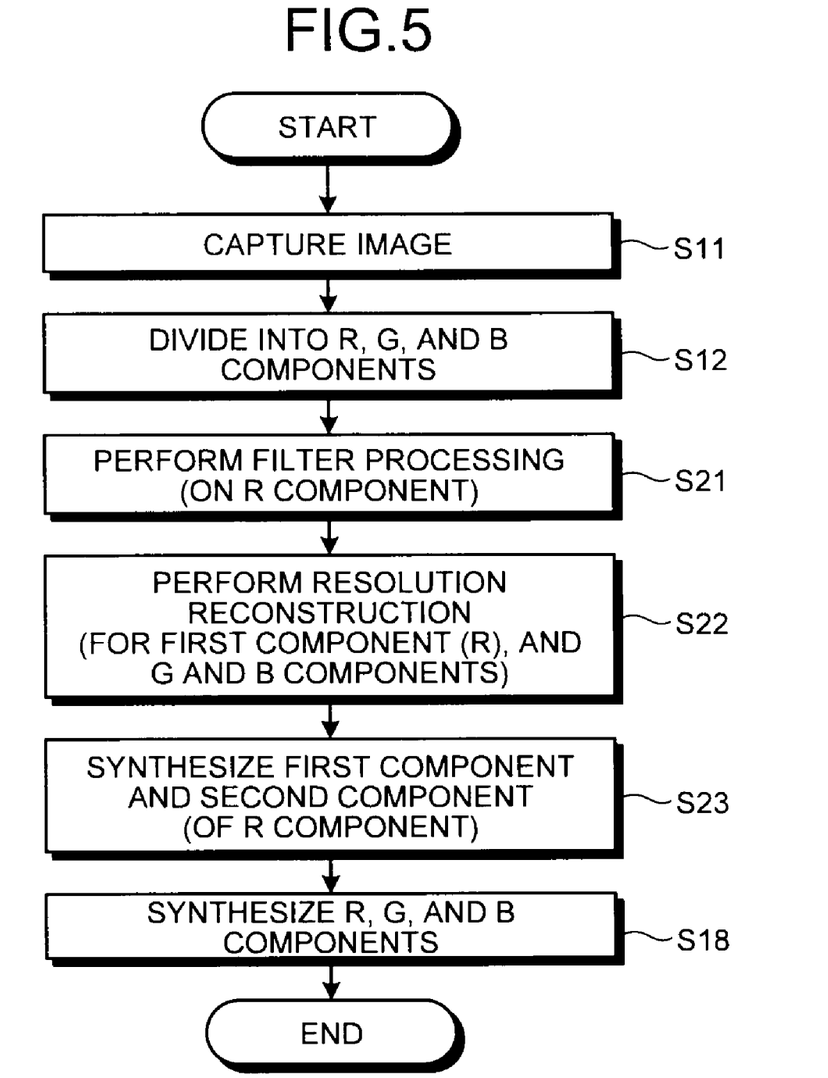
FIG. 5 is a flowchart for explaining a sequence of characteristic operations performed by the image processing device according to a second embodiment of the present invention.

FIG. 5 is a flowchart for explaining a sequence of characteristic operations performed by the image processing device according to a second embodiment of the present invention. The present embodiment is characterized by the fact that the frequency component comparing unit includes a filter processing unit (not illustrated) for separating a component of a predetermined frequency range. When an image of a short-distance subject is captured (Step S11), the image sensor unit 3 generates image signals corresponding to the R, G, and B components (Step S12).

Subsequently, from among all wavelength components, the filter processing unit performs filter processing on the image signal of the R component (Step S21). The R component is the wavelength component that is selected according to the MTF characteristics of the imaging lens 1 as the component having the lowest MTF at a predetermined subject distance such as 30 cm in this case. The filter processing unit divides the image signal of the R component into a first component lying in a high frequency range and a second component lying in a low frequency range. Thus, the second component lies in a frequency range other than the frequency range of the first component. As the filter processing unit that is capable of separating the first component and the second component, it is possible to use either one of a high-pass filter or a lowpass filter. Meanwhile, the threshold frequency for separation in the filter processing can be determined arbitrarily and, for example, separately for each product.

Subsequently, the resolution reconstruction unit performs resolution reconstruction with respect to the image signal of each wavelength component (Step S22). The resolution reconstruction operation performed with respect to the G and B components is identical to that described in the first embodiment. However, from among the first component and the second component of the R component, resolution reconstruction is performed only on the first component. As an algorithm for reconstructing an image that resembles the original subject image during resolution reconstruction, for example, the Richardson-Lucy deconvolution is implemented.

Then, regarding the R component, the first component subjected to resolution reconstruction and the second component not subjected to resolution reconstruction are synthesized (Step S23). Subsequently, the image synthesizing unit performs image synthesis of the image signals of the G and B components subjected to resolution reconstruction at Step S22 and the image signal of the R component synthesized at Step S23 (Step S18).

In this way, in the second embodiment, only that component of the R component which lies in the high frequency range is subjected to resolution reconstruction. That enables achieving high resolution in the portion of subtle changes in an image. Moreover, by not performing the resolution reconstruction operation on the component lying in the low frequency range, it becomes possible to reduce noise in the smooth and flat portion in an image. Hence, according to the second embodiment, high-resolution images can be achieved even when photography is done with a fixed-focus camera module.

Figure 6:
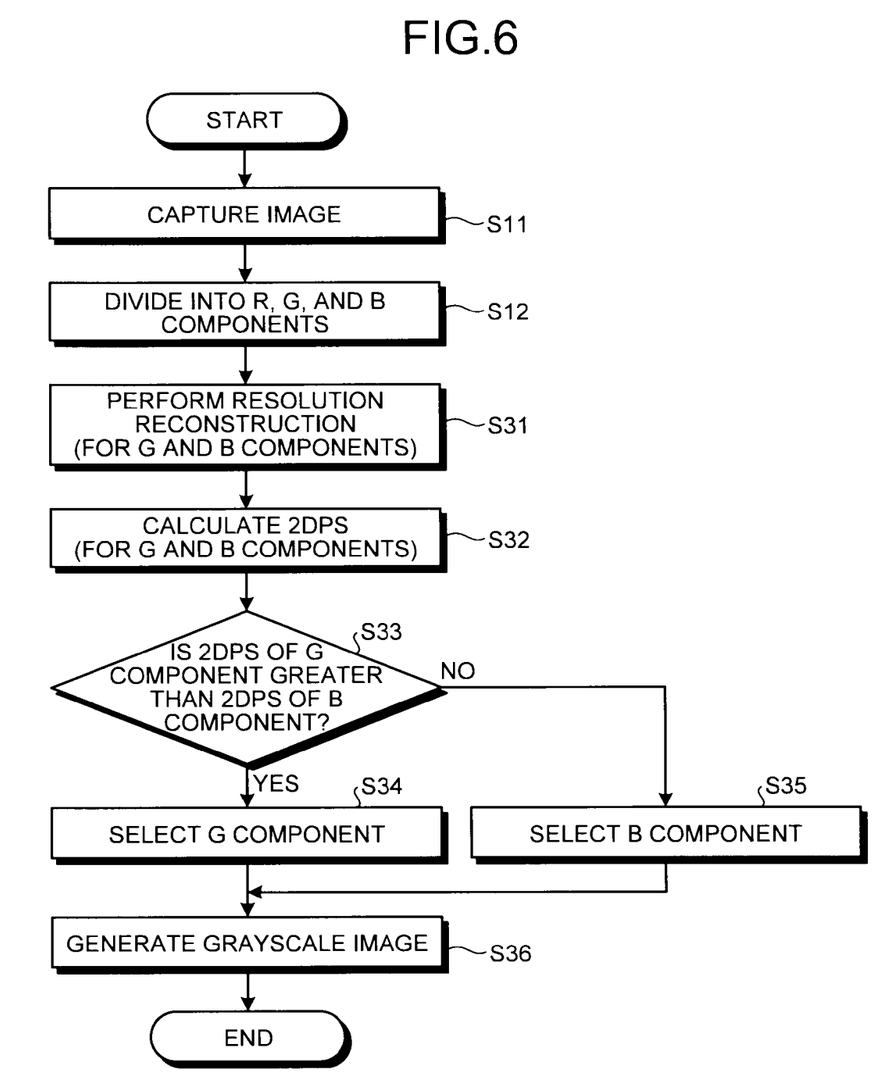
FIG. 6 is a flowchart for explaining a sequence of characteristic operations performed by the image processing device according to a third embodiment of the present invention.

FIG. 6 is a flowchart for explaining a sequence of characteristic operations performed by the image processing device according to a third embodiment of the present invention. In the present embodiment, the explanation is given for the case of monochrome photography of short-distance subjects such as the case of barcode scanning. When an image of a short-distance subject is captured (Step S11), the image sensor unit 3 generates image signals corresponding to the R, G, and B components (Step S12).

Subsequently, the resolution reconstruction unit performs resolution reconstruction with respect to the image signals of the G and B components (Step S32). Herein, the R component having the lowest MTF at a predetermined subject distance such as 30 cm is excluded from the resolution reconstruction operation. The G and B components are the wavelength components selected according to the MTF characteristics of the optical system. As an algorithm for reconstructing an image that resembles the original subject image during resolution reconstruction, for example, the Richardson-Lucy deconvolution is implemented.

Subsequently, with respect to the image signals of the G and B components subjected to resolution reconstruction, conversion from the real space to the frequency space is performed with, for example, the FFT and respective 2DPSs are calculated (Step S32). Then, the frequency component comparing unit compares the 2DPS calculated for the G component with the 2DPS calculated for the B component (Step S33).

If the 2DPS calculated for the G component is greater than the 2DPS calculated for the B component (Yes at Step S33), then the image signal of the G component is selected as the component to be synthesized by the image synthesizing unit (Step S34). On the other hand, if the 2DPS calculated for the G component is equal to or smaller than the 2DPS calculated for the B component (No at Step S33), then the image signal of the B component is selected as the component to be synthesized by the image synthesizing unit (Step S35). The image synthesizing unit then generates a grayscale image with the image signal selected at Step S34 or Step S35 as the component (Step S36).

For example, if the G component is selected at Step S34, then the image synthesizing unit synthesizes the G component with the R and B components that are generated to have the same value as that of the G component. Similarly, if the B component is selected at Step S35, then the image synthesizing unit synthesizes the B component with the R and G components that are generated to have the same value as that of the B component. In this way, the image synthesizing unit generates a grayscale image on the basis of the image signal of that wavelength component which has the largest 2DPS from among all wavelength components. Meanwhile, with respect to the 2DPSs, it is also possible to perform weighting with the use of ½ Nyquist, ¼ Nyquist, or the visual transfer function (VTF), which is a visual MTF characteristic, so that a visually favorable image can be selected.

Figure 7:
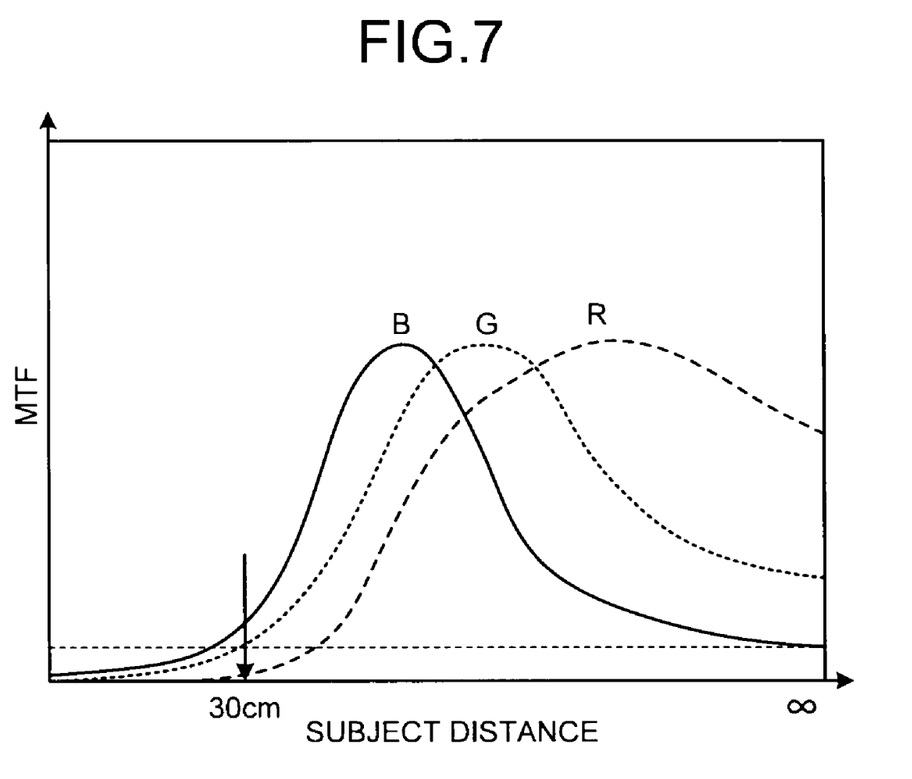
FIG. 7 is a graph of an exemplary MTF characteristic of the optical system in the imaging apparatus.

FIG. 7 is a graph of an exemplary MTF characteristic of the optical system in the imaging apparatus. The graph represents a relation between the subject distance and the MTF at 92 lines/mm regarding each of the R component, the G component, and the B component. Herein, the imaging apparatus is assumed to be an M8 camera module having the pixel size of 2.2 nm square and the resolution of 3281×2464 pixels. In that camera module, in order to scan a barcode with 0.25 mm pitch from a distance of 30 cm and with a view angle of 58°, it is necessary to have the resolution of 92 lines/mm. Similarly, in order to scan a barcode with 0.5 mm pitch, it is necessary to have the resolution of 46 lines/mm.

According to the graph illustrated in FIG. 7, if the subject distance is reduced to about 30 cm, then the MTF for the R component decreases to an extremely low value as compared to the MTFs with respect to the B and G components. Hence, there can be times when the amount of resolution necessary to scan a barcode is obtained only for the B and G components but not for the R component. If that causes blurring of edges of the R component, then it becomes difficult to perform barcode recognition using an image obtained by synthesizing all wavelength components.

In contrast, according to the present embodiment, the wavelength components are selected according to the MTF characteristics of the optical system and a grayscale image is generated on the basis of the wavelength component having the largest 2DPS. That makes it possible to obtain high-resolution images in short-distance photography. Hence, according to the third embodiment, high-resolution images can be achieved even when photography is done with a fixed-focus camera module.

Meanwhile, under the condition of a low color temperature; if the sensitivity of the B component deteriorates significantly as compared to the G component, then it is desirable to select the G component as the component to be synthesized by the image synthesizing unit. Selection of the G component enables achieving a high-resolution image with high accuracy.

Moreover, the sequence of characteristic image processing operations explained in the above-mentioned embodiments is applicable to the macro mode of an image processing device having the resolution reconstruction function. Alternatively, the sequence of operations explained in the abovementioned embodiments is also applicable to a fixed-focus camera with a macro mode option, irrespective of whether that camera includes the resolution reconstruction unit. Besides, the image processing device explained in the abovementioned embodiments can also be configured to perform image processing in a mode other than the macro mode, for example, in the normal mode on the basis of the lens characteristics (PSF, MTF) different than those in the macro mode.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
a resolution reconstruction unit that, with respect to image signals corresponding to wavelength components of at least two colors from among image signals obtained by incorporating light in an optical system, performs resolution reconstruction for each of the wavelength components;
a frequency component comparing unit that performs frequency component comparison for each of the image signals corresponding to the wavelength components subjected to resolution reconstruction; and
an image synthesizing unit that performs image synthesis with an image signal that is selected according to a comparison result of the frequency component comparing unit as a component, wherein
the frequency component comparing unit performs frequency component comparison for a wavelength component selected according to a modulation transfer function characteristic of the optical system.

2. The image processing device according to claim 1, wherein
the frequency component comparing unit calculates a difference by comparing a two-dimensional power spectrum calculated for a first wavelength component and a two-dimensional power spectrum calculated for a second wavelength component that, as compared to the first wavelength component, has a lower value for the modulation transfer function at a predetermined subject distance,
if the difference is smaller than a predetermined threshold value, then the frequency component comparing unit selects a post-resolution-reconstruction image signal as the second wavelength component to be synthesized by the image synthesizing unit, and
if the difference is greater than the predetermined threshold value, then the frequency component comparing unit selects a pre-resolution-reconstruction image signal as the second wavelength component to be synthesized by the image synthesizing unit.

3. The image processing device according to claim 2, wherein the second wavelength component is red color component.

4. The image processing device according to claim 1, wherein
the frequency component comparing unit includes a filter processing unit that separates, from an image signal corresponding to a wavelength component selected according to the modulation transfer function characteristic of the optical system, a first component lying in a predetermined frequency range, and
regarding selected wavelength component, from among the first component and a second component that lies in a frequency range other than the predetermined frequency range, the resolution reconstruction unit performs resolution reconstruction for the first component.

5. The image processing device according to claim 4, wherein, regarding the selected wavelength component, the first component subjected to resolution reconstruction and the second component not subjected to resolution reconstruction are synthesized.

6. The image processing device according to claim 4, wherein
the filter processing unit separates the first component from an image signal corresponding to red color component, and
the resolution reconstruction unit performs resolution reconstruction for the first component of the red color component.

7. The image processing device according to claim 1, wherein
the frequency component comparing unit compares a two-dimensional power spectrum calculated for each of wavelength components of at least two colors, and
from among the wavelength components of at least two colors, the image synthesizing unit generates a grayscale image on basis of an image signal corresponding to a wavelength component having largest of the two-dimensional power spectrum.

8. The image processing device according to claim 7, wherein
a wavelength component other than the wavelength component having largest of the two-dimensional power spectrum is set to have a signal value identical to a signal value of the wavelength component having largest of the two-dimensional power spectrum, and
the image synthesizing unit synthesizes the wavelength component having largest of the two-dimensional power spectrum and the wavelength component other than the wavelength component having largest of the two-dimensional power spectrum.

9. The image processing device according to claim 7, wherein
the frequency component comparing unit compares the two-dimensional power spectrum calculated for green color component with the two-dimensional power spectrum calculated for blue color component, and
the image synthesizing unit generates a grayscale image on basis of an image signal corresponding to either one of the green color component and the blue color component having larger of the two-dimensional power spectrum.

10. The image processing device according to claim 1, wherein the resolution reconstruction unit performs resolution reconstruction based on a point spread function characteristic of the optical system.

11. An image processing method comprising:
resolution-reconstructing that includes performing, with respect to image signals corresponding to wavelength components of at least two colors from among image signals obtained by incorporating light in an optical system, resolution reconstruction for each of the wavelength components;
comparing that includes performing frequency component comparison for each of the image signals corresponding to the wavelength components subjected to resolution reconstruction; and
synthesizing that includes performing image synthesis with an image signal that is selected according to a comparison result at the comparing as a component, wherein
the comparing includes performing frequency component comparison for a wavelength component selected according to a modulation transfer function characteristic of the optical system.

12. The image processing method according to claim 11, wherein the comparing includes
calculating a difference by comparing a two-dimensional power spectrum calculated for a first wavelength component and a two-dimensional power spectrum calculated for a second wavelength component that, as compared to the first wavelength component, has a lower value for the modulation transfer function at a predetermined subject distance,
selecting, if the difference is smaller than a predetermined threshold value, a post-resolution-reconstruction image signal as the second wavelength component to be synthesized at the synthesizing, and
selecting, if the difference is greater than the predetermined threshold value, a pre-resolution-reconstruction image signal as the second wavelength component to be synthesized at the synthesizing.

13. The image processing method according to claim 11, wherein
the comparing includes separating, from an image signal corresponding to a wavelength component selected according to the modulation transfer function characteristic of the optical system, a first component lying in a predetermined frequency range, and
regarding selected wavelength component, the resolution-reconstructing includes performing, from among the first component and a second component that lies in a frequency range other than the predetermined frequency range, resolution reconstruction for the first component.

14. The image processing device according to claim 11, wherein
the comparing includes comparing a two-dimensional power spectrum calculated for each of wavelength components of at least two colors, and
from among the wavelength components of at least two colors, the synthesizing includes generating a grayscale image on basis of an image signal corresponding to a wavelength component having largest of the two-dimensional power spectrum.

15. The image processing device according to claim 11, wherein the resolution-reconstructing includes performing resolution reconstruction based on a point spread function characteristic of the optical system.

16. An imaging apparatus comprising:
an optical system that incorporates light;
an image sensor unit that captures an image of a subject by converting the light incorporated by the optical system into a signal charge; and
an image processing device that processes an image signal obtained by image capturing performed by the image sensor unit, the image processing device including
a resolution reconstruction unit that, with respect to image signals corresponding to wavelength components of at least two colors, performs resolution reconstruction for each of the wavelength components;
a frequency component comparing unit that performs frequency component comparison for each of the image signals corresponding to the wavelength components subjected to resolution reconstruction; and
an image synthesizing unit that performs image synthesis with an image signal that is selected according to a comparison result of the frequency component comparing unit as a component, wherein
the frequency component comparing unit performs frequency component comparison for a wavelength component selected according to a modulation transfer function characteristic of the optical system.

17. The imaging apparatus according to claim 16, wherein
the frequency component comparing unit calculates a difference by comparing a two-dimensional power spectrum calculated for a first wavelength component and a two-dimensional power spectrum calculated for a second wavelength component that, as compared to the first wavelength component, has a lower value for the modulation transfer function at a predetermined subject distance,
if the difference is smaller than a predetermined threshold value, then the frequency component comparing unit selects a post-resolution-reconstruction image signal as the second wavelength component to be synthesized by the image synthesizing unit, and
if the difference is greater than the predetermined threshold value, then the frequency component comparing unit selects a pre-resolution-reconstruction image signal as the second wavelength component to be synthesized by the image synthesizing unit.

18. The imaging apparatus according to claim 16, wherein
the frequency component comparing unit includes a filter processing unit that separates, from an image signal corresponding to a wavelength component selected according to the modulation transfer function characteristic of the optical system, a first component lying in a predetermined frequency range, and
regarding selected wavelength component, from among the first component and a second component that lies in a frequency range other than the predetermined frequency range, the resolution reconstruction unit performs resolution reconstruction for the first component.

19. The imaging apparatus according to claim 16, wherein
the frequency component comparing unit compares a two-dimensional power spectrum calculated for each of wavelength components of at least two colors, and
from among the wavelength components of at least two colors, the image synthesizing unit generates a grayscale image on basis of an image signal corresponding to a wavelength component having largest of the two-dimensional power spectrum.

20. The imaging apparatus according to claim 16, wherein
the resolution reconstruction unit performs resolution reconstruction based on a point spread function characteristic of the optical system.

* * * * *